US009288919B2

(12) United States Patent
Hsu et al.

(10) Patent No.: US 9,288,919 B2
(45) Date of Patent: Mar. 15, 2016

(54) DISPLAY MODULE

(71) Applicant: Hannstar Display Corporation, New Taipei (TW)

(72) Inventors: Ti-Chia Hsu, Taoyuan County (TW); Tung-Hsien Yu, Nantou County (TW)

(73) Assignee: HannStar Display Corporation, Taipei (TW)

( * ) Notice: Subject to any disclaimer, the term of this patent is extended or adjusted under 35 U.S.C. 154(b) by 419 days.

(21) Appl. No.: 13/668,326

(22) Filed: Nov. 5, 2012

(65) Prior Publication Data
US 2014/0085780 A1    Mar. 27, 2014

(30) Foreign Application Priority Data

Sep. 27, 2012    (CN) .......................... 2012 1 0374509

(51) Int. Cl.
H05K 5/02        (2006.01)
G02F 1/1333    (2006.01)

(52) U.S. Cl.
CPC ............ *H05K 5/02* (2013.01); *G02F 1/133308* (2013.01); *G02F 2001/13332* (2013.01)

(58) Field of Classification Search
CPC ................ G02F 1/133308; G02F 2001/13332; H05K 5/02
USPC ............. 361/679.01, 679.02, 679.21, 679.27; 211/183
See application file for complete search history.

(56) References Cited

U.S. PATENT DOCUMENTS

| 7,760,289 | B2* | 7/2010 | Nakanishi et al. | 349/60 |
| 7,929,073 | B2* | 4/2011 | Hsu et al. | 349/58 |
| 2009/0103001 | A1* | 4/2009 | Choi | 349/58 |
| 2013/0083267 | A1* | 4/2013 | Zhou | 349/58 |
| 2014/0226103 | A1* | 8/2014 | Zhuang et al. | 349/58 |

FOREIGN PATENT DOCUMENTS

CN        201041606        3/2008

OTHER PUBLICATIONS

"Office Action of China Counterpart Application," issued on Dec. 1, 2015, pp. 1-8.

* cited by examiner

*Primary Examiner* — Bernard Rojas
(74) *Attorney, Agent, or Firm* — Jianq Chyun IP Office

(57) ABSTRACT

A display module and a front frame, a back frame and a plastic frame used in the display module are disclosed by the invention. The display module includes a front frame, a back frame, a plastic frame and a display unit. The front frame has a top-plate, a plurality of front-side-plates connecting the top-plate and at least two first position-limiting openings. The back frame has a bottom-plate, a plurality of back-side-plates connecting the bottom-plate and at least two second position-limiting openings. The plastic frame is disposed between the front frame and the back frame and includes a body, at least one side-wall, at least two baffle-wall portions and at least two retracted portions. The first position-limiting openings and the second position-limiting openings expose the baffle-wall portions.

15 Claims, 4 Drawing Sheets

DISPLAY MODULE

CROSS-REFERENCE TO RELATED APPLICATION

This application claims the priority benefit of China application serial no. 201210374509.3, filed on Sep. 27, 2012. The entirety of the above-mentioned patent application is hereby incorporated by reference herein and made a part of this specification.

BACKGROUND OF THE INVENTION

1. Field of the Invention

The invention generally relates to a display module, and more particularly, to a display module with slim boarder.

2. Description of Related Art

With the vigorous development of display technology, displays with various sizes, such as TV, computer screen, notebook computer, mobile phone, have been vigorously developed. Taking a notebook computer as an example, in addition to the requirements from the consumers on the displaying performance of the monitor display, such as resolution, contrast, viewing angle, the consumers further have increasing demand on the aesthetic appearance of the display itself. Therefore, the display manufactures have also put the devotions thereof to designing the slim boarder (narrow frame) to make the display more compact characteristic with the same display quality so as to meet consumer demand.

In terms of display, it is mainly composed of a display panel and a backlight unit, and wherein the backlight unit is generally constituted by a light guide plate (LGP), a light source and a plastic frame. The plastic frame is configured for carrying the above-described LGP and light source, and the display panel is also assembled onto the plastic frame. In general speaking, in order to firmly assembly the plastic frame with the appearance parts (for example, front frame and back frame) of the display and meanwhile to protect all the parts in the plastic frame and the display panel, usually a metallic bezel is used for cladding the plastic frame and the display panel, followed by using the front frame and back frame of the display to fix the metallic bezel and the display panel clad in the metallic bezel to the backlight unit. However, by using the above-mentioned design, the plastic frame of the backlight unit and the back frame and front frame of the display would overlap and cover each other, which leads the thickness of the boarder of the display unable to get thinner and thus the boarder of the display can not be made slim.

SUMMARY OF THE INVENTION

Accordingly, the invention is directed to a display module with a slim boarder.

The invention is also directed to a front frame used in a display module, a back frame used in a display module and a plastic frame used in a display module, which are able to solve the relevant technical problem in the display technology field.

To achieve the above-mentioned objects, the invention provides a front frame used in a display module, which includes a top-plate, a plurality of front-side-plates connecting the top-plate and at least two first position-limiting openings, in which the first position-limiting openings are located on at least two adjacent corners defined by the front-side-plates.

The invention further provides a back frame used in a display module, which includes a bottom-plate, a plurality of back-side-plates connecting the bottom-plate and at least two second position-limiting openings, in which the second position-limiting openings are located on at least two adjacent corners defined by the back-side-plates.

The invention further provides a plastic frame used in a display module, which includes a body, at least one side-wall, at least two baffle-wall portions and at least two retracted portions. The side-wall is perpendicularly connecting the body, the baffle-wall portions connect two opposite end-surfaces of the side-wall, and the retracted portions are located on a lower-surface of the body.

The invention further provides a display module, which includes a front frame, a back frame, a plastic frame and a display unit. The front frame has a top-plate, a plurality of front-side-plates connecting the top-plate and at least two first position-limiting openings, in which the first position-limiting openings are located on at least two adjacent corners defined by the front-side-plates. The back frame has a bottom-plate, a plurality of back-side-plates connecting the bottom-plate and at least two second position-limiting openings, in which the front-side-plates of the front frame cover the back-side-plates of the back frame and the second position-limiting openings are located on at least two adjacent corners defined by the back-side-plates and disposed correspondingly to the first position-limiting openings. The plastic frame is disposed between the front frame and the back frame and includes a body, at least one side-wall, at least two baffle-wall portions and at least two retracted portions. The side-wall is perpendicularly connected to the body, the baffle-wall portions connect two opposite end-surfaces of the side-wall, and the retracted portions are located on a lower-surface of the body. The first position-limiting openings of the front frame and the second position-limiting openings of the back frame expose the baffle-wall portions.

In an embodiment of the invention, a side-surface of each of the retracted portions adjacent to the corresponding baffle-wall portion and the lower-surface of the body together define an accommodation space.

In an embodiment of the invention, at least two corresponding back-side-plates of the back frame are located in the accommodation spaces.

In an embodiment of the invention, the cross-section of each the retracted portion of the plastic frame is in step-like shape.

In an embodiment of the invention, a distance between a first side-surface of the display unit relatively adjacent to each the baffle-wall portion and a second side-surface of the baffle-wall portion relatively far from the display unit is between 0.1 mm and 1 mm.

In an embodiment of the invention, the second side-surfaces of the baffle-wall portions are protruded from an outer-side surface of the back-side-plates.

In an embodiment of the invention, the second side-surfaces of the baffle-wall portions are protruded from an upper-side surface of the front frame.

In an embodiment of the invention, the second side-surfaces of the baffle-wall portions are flush with the front-side-plates of the front frame.

In an embodiment of the invention, the body, the side-wall, the baffle-wall portions and the retracted portions of the plastic frame are integrally formed.

In an embodiment of the invention, the display unit includes a lower substrate, the lower substrate has a carrying surface and the height of each the baffle-wall portion is higher than the carrying surface.

In an embodiment of the invention, each the baffle-wall portion has an arc profile or a rectangular profile.

In an embodiment of the invention, a hole width of each of the first position-limiting openings and a hole width of each of the second position-limiting openings are greater than a width of each of the baffle-wall portions.

In an embodiment of the invention, the front frame has at least one first locking portion, and the back frame has at least one second locking portion locked with the first locking portion.

In an embodiment of the invention, the back frame has at least one third locking portion and the plastic frame has at least one fourth locking portion locked with the third locking portion.

In an embodiment of the invention, the materials of the front frame and the back frame include metal.

In an embodiment of the invention, the baffle-wall portions are located on an upper-surface of the body.

In an embodiment of the invention, the orthogonal projections of the retracted portions and the orthogonal projections of the baffle-wall portions on the body are not overlapped with each other.

Based on the description above, the first position-limiting openings of the front frame and the second position-limiting openings of the back frame in the invention expose the baffle-wall portions of the plastic frame, the back-side-plates of the back frame are located in the accommodation space defined by a side-surface of each of the retracted portions of the plastic frame adjacent to the corresponding baffle-wall portion and the lower-surface of the body, and the corners of the display unit are located between the baffle-wall portions. Thus, in comparison with the current display in the prior art where the plastic frame of the backlight unit, the back frame of the display and the front frame sequentially overlap and cover the assembled display, the design of the display module in the invention has a less border's width so as to reduce the thicknesses of the front frame and the back frame at the corners and the thicknesses of the plastic frame and the back frame at the side-edges. In this way, the display module of the invention achieves a design effect of slim border.

In order to make the features and advantages of the present invention more comprehensible, the present invention is further described in detail in the following with reference to the embodiments and the accompanying drawings.

DESCRIPTION OF THE EMBODIMENTS

Figure 1A:
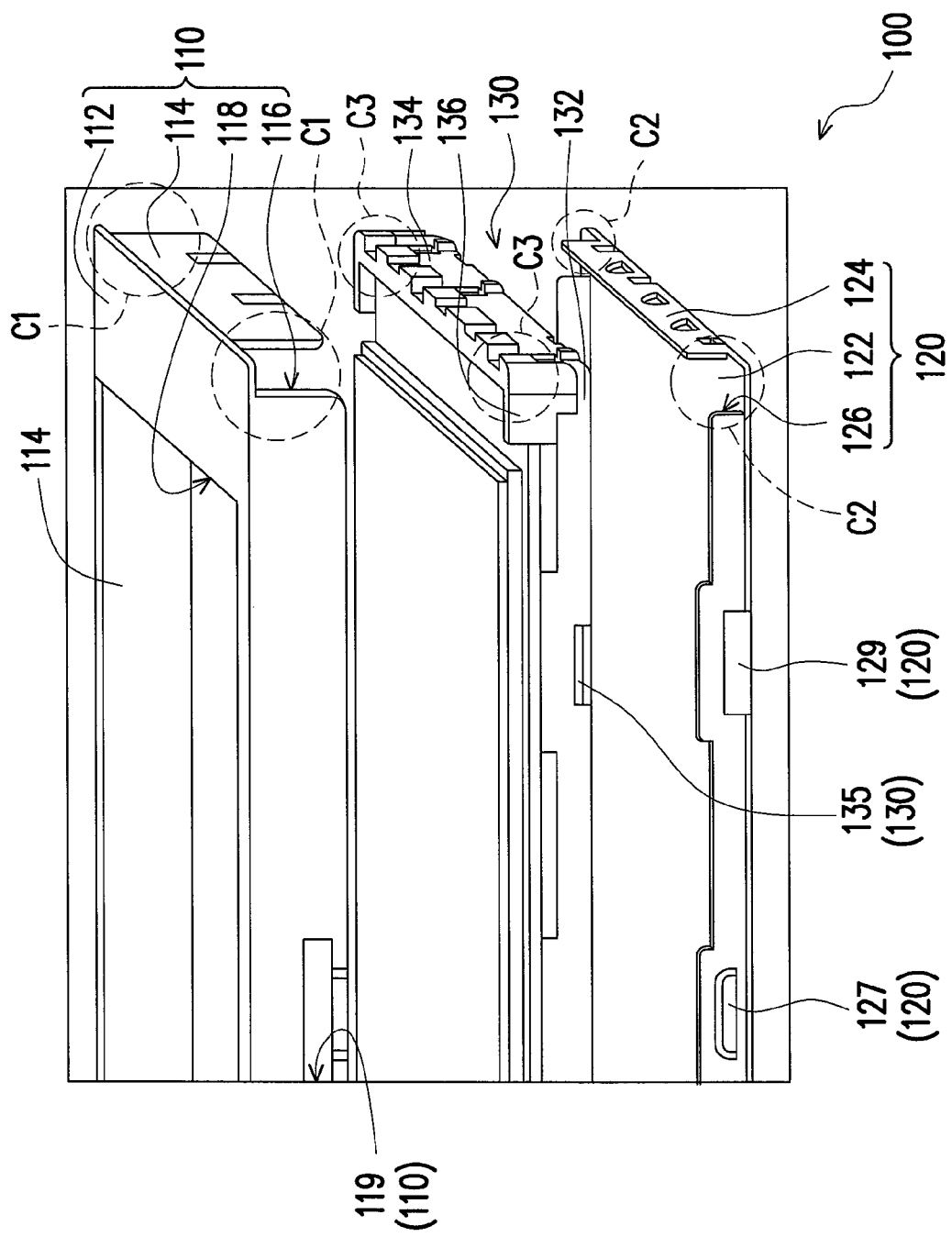
FIG. 1A is an exploded three-dimensional diagram of a display module according to an embodiment of the invention.
Figure 1B:
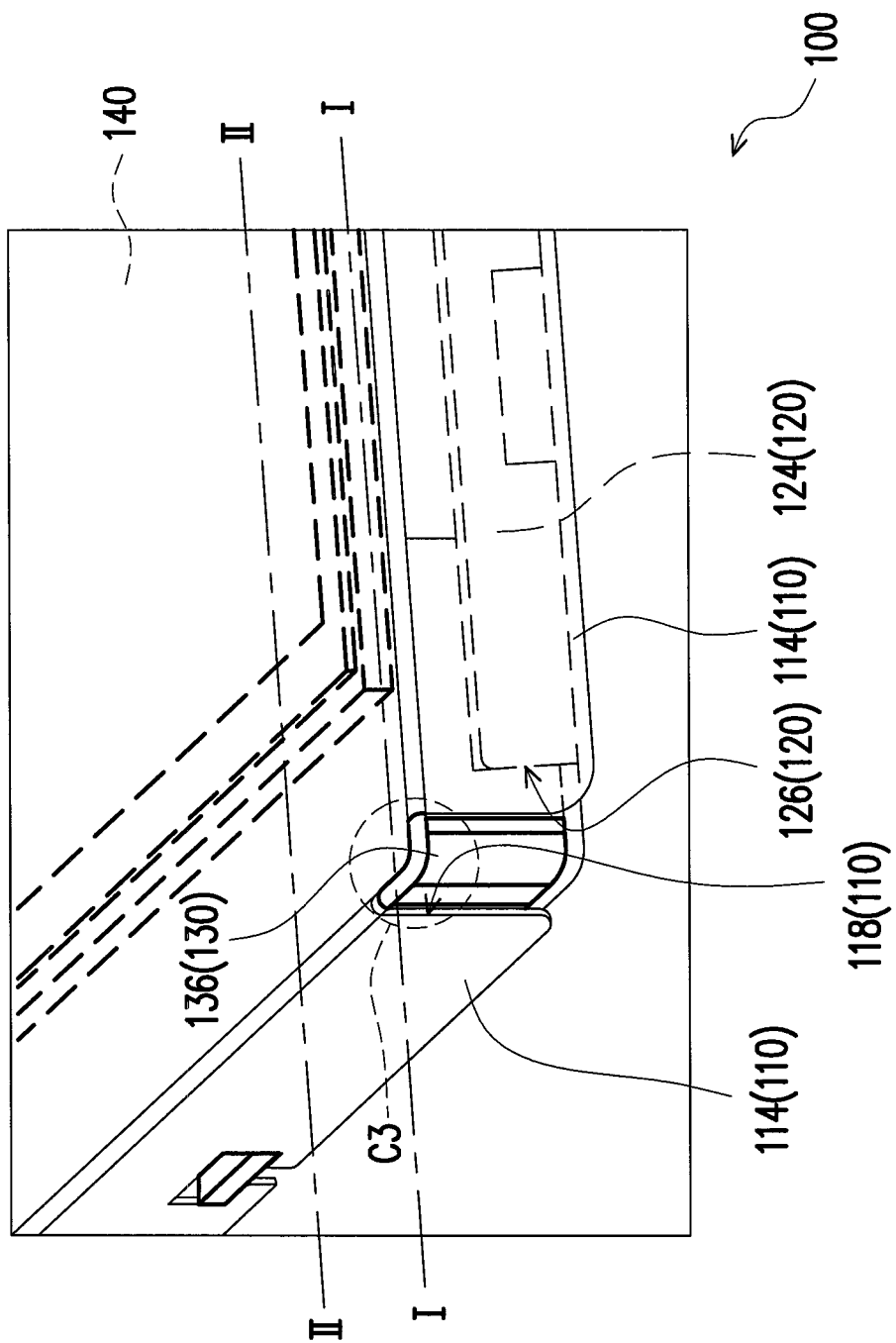
FIG. 1B is a partial three-dimensional perspective diagram of the display module of FIG. 1A after assembling.
Figure 1C:
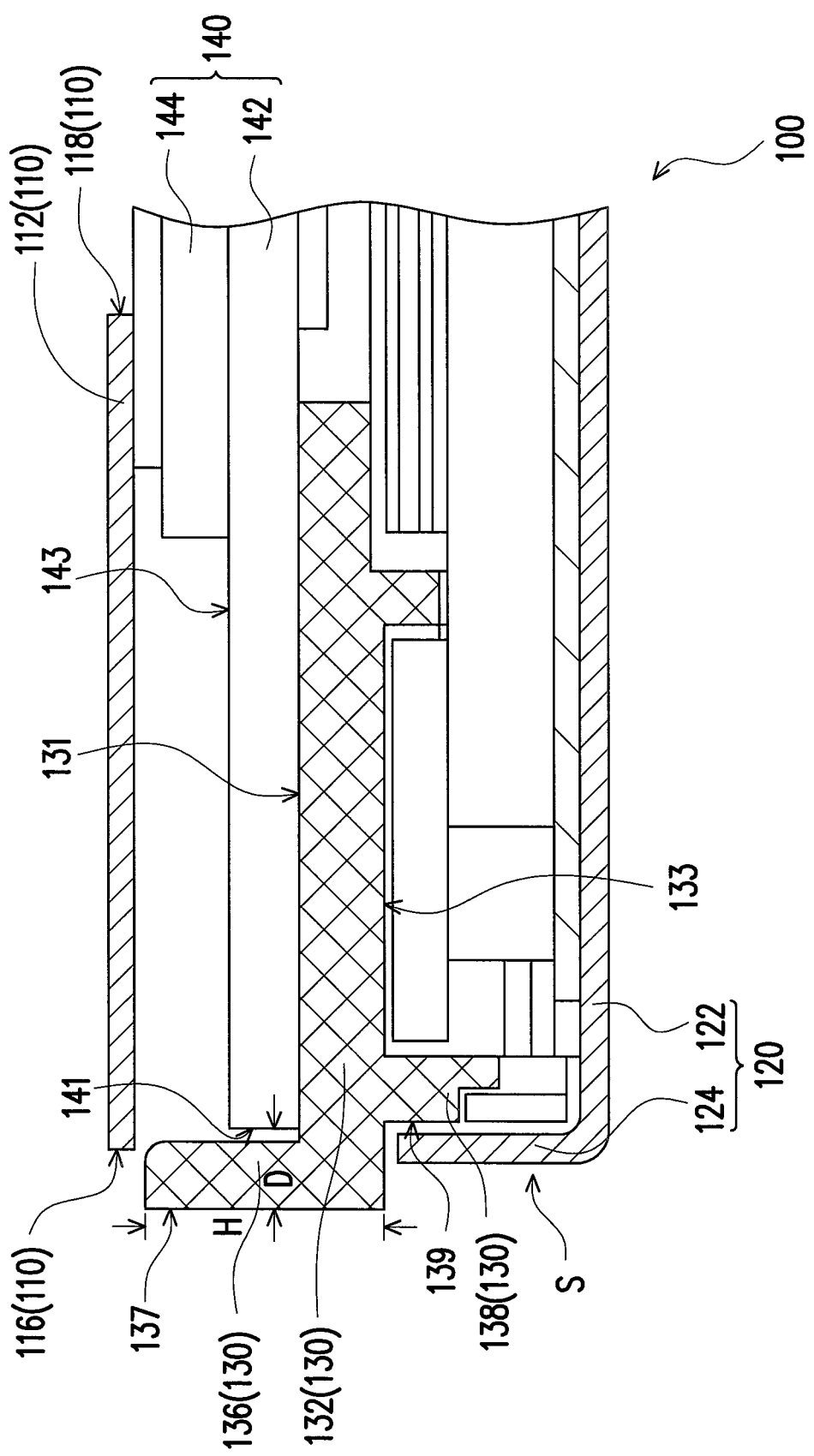
FIG. 1C is a cross-sectional diagram of the display module along line I-I of FIG. 1B.
Figure 1D:
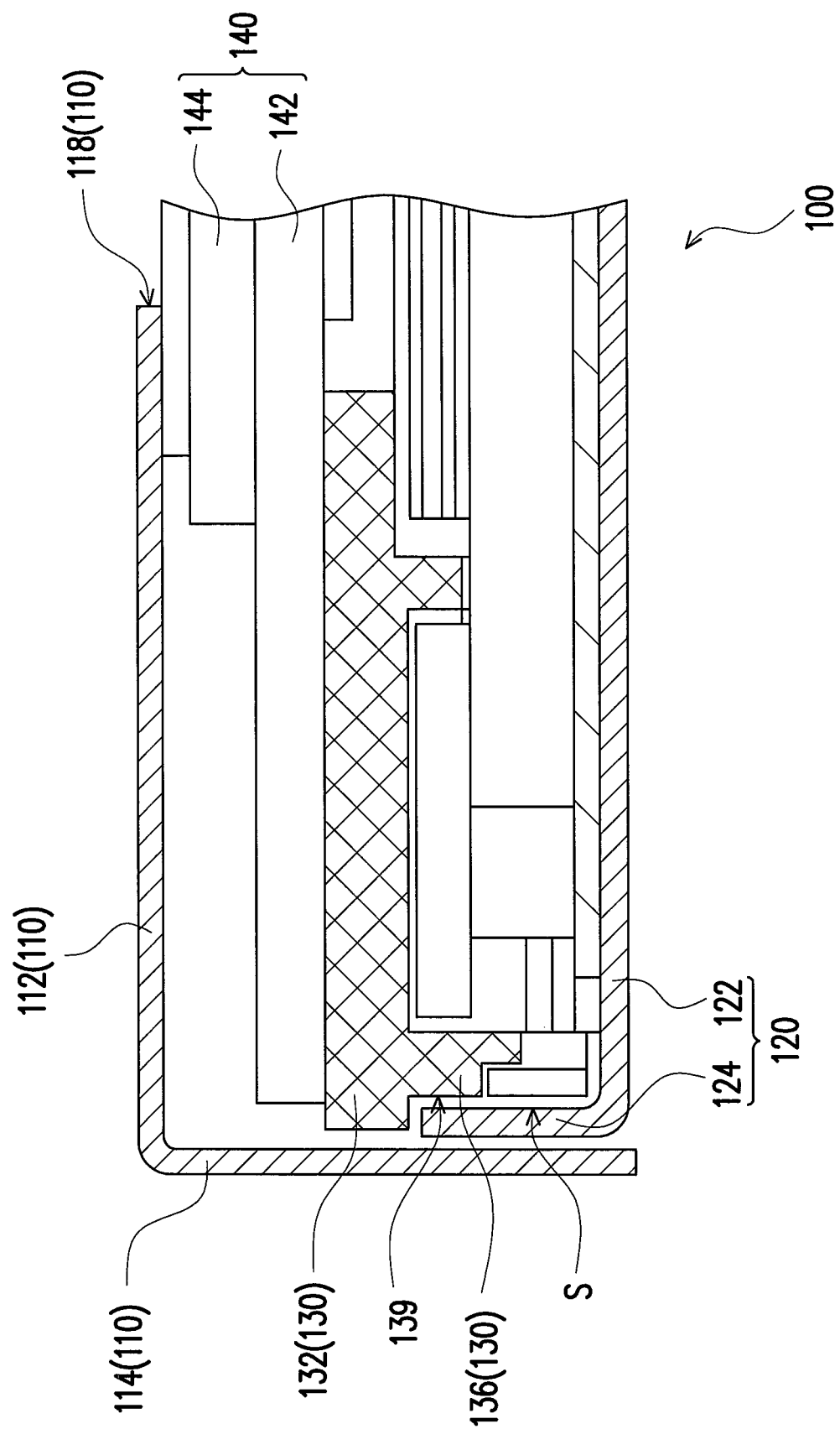
FIG. 1D is a cross-sectional diagram of the display module along line II-II of FIG. 1B.

FIG. 1A is an exploded three-dimensional diagram of a display module according to an embodiment of the invention, FIG. 1B is a partial three-dimensional perspective diagram of the display module of FIG. 1A after assembling, FIG. 1C is a cross-sectional diagram of the display module along line I-I of FIG. 1B and FIG. 1D is a cross-sectional diagram of the display module along line II-II of FIG. 1B. For better understanding, some parts in FIG. 1B are omitted. Referring to FIGS. 1A, 1B, 1C and 1D, in the embodiment, the display module 100 includes a front frame 110, a back frame 120, a plastic frame 130 and a display unit 140.

In more details, the front frame 110 has a top-plate 112, a plurality of front-side-plates 114 connecting the top-plate 112 and at least two first position-limiting openings 116, in which the first position-limiting openings 116 are located on at least two adjacent corners C1 defined by the front-side-plates 114. The back frame 120 has a bottom-plate 122, a plurality of back-side-plates 124 connecting the bottom-plate 122 and at least two second position-limiting openings 126, in which the front-side-plates 114 of the front frame 110 cover the back-side-plates 124 of the back frame 120, while the second position-limiting openings 126 are located on at least two adjacent corners C2 defined by the back-side-plates 124 and disposed correspondingly to the first position-limiting openings 116.

The plastic frame 130 is disposed between the front frame 110 and the back frame 120 and includes a body 132, at least one side-wall 134, at least two baffle-wall portions 136 and at least two retracted portions 138. The body 132 is perpendicular to and connected to the side-wall 134, the baffle-wall portions 136 connect the opposite two end-surfaces of the side-wall 134 and located on an upper-surface 131 of the body 132. The retracted portions 138 are located on a lower-surface 133 of the body 132, and the orthogonal projections of the baffle-wall portions 136 and the retracted portions 138 on the body 132 are not overlapped with each other.

The first position-limiting openings 116 of the front frame 110 and the second position-limiting openings 126 of the back frame 120 expose the baffle-wall portions 136. A side-surface 139 of each of the retracted portions 138 adjacent to the corresponding baffle-wall portion 136 and the lower-surface 133 of the body 132 together define an accommodation space S. At least two corresponding back-side-plates 124 of the back frame 120 are located in the accommodation space S. The display unit 140 is disposed on the body 132 of the plastic frame 130, in which at least two corners C3 of the display unit 140 are located between the baffle-wall portions 136.

Moreover, the front frame 110 of the display module 100 further has a third position-limiting opening 118, in which the third position-limiting opening 118 is located on the top-plate 112 and exposes the display unit 140. The display unit 140 herein includes a lower substrate 142 and a upper substrate 144, the lower substrate 142 has a carrying surface 143 for carrying a driving IC chip or an FPC (not shown), and the height H of each of the baffle-wall portions 136 of the plastic frame 130 is higher than the carrying surface 143. The upper substrate 144 is, for example, a liquid crystal upper substrate, which the invention is not limited to. Since the height H of the baffle-wall portions 136 is higher than the carrying surface 143 of the lower substrate 142, the baffle-wall portions 136 can serve as the positioning marks and the buffer object of the upper substrate 144. The body 132, the side-wall 134, the baffle-wall portions 136 and the retracted portions 138 of the plastic frame 130 are, for example, integrally formed, and the cross section of each of the retracted portions 138 of the plastic frame 130 is, for example, in step-like shape. Each of the baffle-wall portions 136 is, for example, an arc profile or a rectangular profile.

In FIGS. 1A and 1B herein, the baffle-wall portions 136 have arc profile. Both the hole width of each of the first position-limiting openings 116 of the front frame 110 and the hole width of each of the second position-limiting openings 126 of the back frame 120 are greater than the width of each of the baffle-wall portions 136. As a result, the baffle-wall portions 136 can be entirely exposed out of the first position-limiting openings 116 and the second position-limiting openings 126, i.e., both the front frame 110 and the back frame 120 do not shield the baffle-wall portions 136 of the plastic frame 130. In particular, the distance D between a first side-surface 141 of the display unit 140 relatively adjacent to each the baffle-wall portion 136 and a second side-surface 137 of the baffle-wall portion 136 relatively far from the display unit 140 is, for example, between 0.1 mm and 1 mm. In the embodiment, the second side-surfaces 137 of the baffle-wall portions 136 are protruded from an outer-side surface of the back-side-plates 124 and an upper-side surface of the front frame 110, but are flush with the front-side-plates 114 of the front frame 110.

In order to assemble the front frame 110, the back frame 120 and the plastic frame 130 together, the front frame 110 has at least one first locking portion 119, the back frame 120 has at least one second locking portion 127 and at least one third locking portion 129, while the plastic frame 130 has at least one fourth locking portion 135. The first locking portion 119 is locked with the second locking portion 127 to fix the front frame 110 on the back frame 120, and the third locking portion 129 is locked with the fourth locking portion 135 to fix the plastic frame 130 on the back frame 120. The first locking portion 119 and the third locking portion 129 are, for example, a locking slot or a locking hole, while the second locking portion 127 and the fourth locking portion 135 are, for example, a hook or a locking block, which the invention is not limited to. In other embodiments, first locking portion 119 and the third locking portion 129 are, for example, a hook or a locking block, while the second locking portion 127 and the second locking portion 127 and the fourth locking portion 135 are, for example, a locking slot or a locking hole, and all the layouts belong to the scheme adopted by the invention and fall into the protected scope of the invention. In addition, the materials of the front frame 110 and the back frame 120 in the embodiment are, for example, metal.

Since the first position-limiting openings 116 of the front frame 110 and the second position-limiting openings 126 of the back frame 120 in the embodiment make the baffle-wall portions 136 of the plastic frame 130 exposed, the back-side-plates 124 of the back frame 120 are located in the accommodation space S, and the corners C3 of the display unit 140 are located between the baffle-wall portions 136, therefore, the thicknesses of the front frame 110 and the back frame 120 at the corners (i.e. C1, C2 and C3) of the display module 100 in the embodiment can be reduced, i.e., at the corners, the meaningful dimensions related to the thickness are only the thickness of the baffle-wall portions 136 and the distance between the lower substrate 142 of the display unit 140 and the baffle-wall portions 136 and the thicknesses of the plastic frame 130 and the back frame 120 at the side-edge of the display module 100 (where the front-side-plates 114 and the back-side-plates 124 are located at) is reduced as well. In fact, at the side-edge, the meaningful dimensions are only the thickness of the front-side-plates 114 and the distance between the lower substrate 142 of the display unit 140 and the front-side-plates 114. In comparison with the prior art where the plastic frame of the display unit, the back frame and the front frame of the display overlap and cover the assembled display, the display module 100 of the embodiment achieve a slim boarder design effect.

It should be noted that the invention does not limit the quantities of the first position-limiting openings 116, the second position-limiting openings 126 and the baffle-wall portions 136. Although the quantities of the first position-limiting openings 116, the second position-limiting openings 126 and the baffle-wall portions 136 herein are respectively two, but in other embodiments, the quantities of the first position-limiting openings 116, the second position-limiting openings 126 and the baffle-wall portions 136 can be respectively four, i.e., the four corners of the display module 100 respectively have the first position-limiting openings 116, the second position-limiting openings 126 and the baffle-wall portions 136 disposed, which still belongs to the scheme of the invention and falls in the protected scope of the invention.

In summary, the first position-limiting openings of the front frame and the second position-limiting openings of the back frame in the invention expose the baffle-wall portions of the plastic frame, the back-side-plates of the back frame are located in the accommodation space defined by a side-surface of each of the retracted portions of the plastic frame adjacent to the corresponding baffle-wall portion and the lower-surface of the body, and the corners of the display unit are located between the baffle-wall portions. Thus, in comparison with the current display in the prior art where the plastic frame of the backlight unit, the back frame of the display and the front frame sequentially overlap and cover the assembled display, the design of the display module in the invention has a less border's width so as to reduce the thicknesses of the front frame and the back frame at the corners and the thicknesses of the plastic frame and the back frame at the side-edges. In this way, the display module of the invention achieves a design effect of slim border.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A display module, comprising:
a front frame, comprising:
a top-plate;
a plurality of front-side-plates connecting the top-plate;
at least two first position-limiting openings, located on at least two adjacent corners defined by the front-side-plates; and
at least one first locking portion; and
a back frame, comprising:
a bottom-plate;
a plurality of back-side-plates connecting the bottom-plate;
at least two second position-limiting openings, located on at least two adjacent corners defined by the back-side-plates, wherein the front-side-plates of the front frame cover the back-side-plates of the back frame and the second position-limiting openings are disposed correspondingly to the first position-limiting openings;
at least one second locking portion, locked with the first locking portion; and
at least one third locking portion;
a plastic frame disposed between the front frame and the back frame, the plastic frame comprising:
a body;
at least one side-wall, perpendicularly connected to the body;
at least two baffle-wall portions, connecting two opposite end-surfaces of the side-wall;
at least two retracted portions, located on a lower-surface of the body; and
at least one fourth locking portion locked with the third locking portion; and
a display unit, disposed on the body of the plastic frame, wherein at least two adjacent corners of the display unit are located between the baffle-wall portions, wherein the first position-limiting openings of the front frame and the second position-limiting openings of the back frame expose the baffle-wall portions.

2. The display module as claimed in claim 1, wherein a side-surface of each of the retracted portions adjacent to the corresponding baffle-wall portion and the lower-surface of the body together define an accommodation space.

3. The display module as claimed in claim 2, wherein at least two corresponding back-side-plates of the back frame are located in the accommodation spaces.

4. The display module as claimed in claim 1, wherein cross-section of each the retracted portion of the plastic frame is in step-like shape.

5. The display module as claimed in claim 1, wherein a distance between a first side-surface of the display unit adjacent to each the baffle-wall portion and a second side-surface of the baffle-wall portion far from the display unit is between 0.1 mm and 1 mm.

6. The display module as claimed in claim 5, wherein the second side-surfaces of the baffle-wall portions are protruded from an outer-side surface of the back-side-plates.

7. The display module as claimed in claim 5, wherein the second side-surfaces of the baffle-wall portions are protruded from an upper-side surface of the front frame.

8. The display module as claimed in claim 5, wherein the second side-surfaces of the baffle-wall portions are flush with the front-side-plates of the front frame.

9. The display module as claimed in claim 1, wherein the body, the side-wall, the baffle-wall portions and the retracted portions of the plastic frame are integrally formed.

10. The display module as claimed in claim 1, wherein the display unit comprises a lower substrate, the lower substrate has a carrying surface and height of each the baffle-wall portion is higher than the carrying surface.

11. The display module as claimed in claim 1, wherein each the baffle-wall portion has an arc profile or a rectangular profile.

12. The display module as claimed in claim 1, wherein a hole width of each of the first position-limiting openings and a hole width of each of the second position-limiting openings are greater than a width of each of the baffle-wall portions.

13. The display module as claimed in claim 1, wherein materials of the front frame and the back frame comprise metal.

14. The display module as claimed in claim 1, wherein orthogonal projections of the retracted portions on the body are not overlapped with orthogonal projections of the baffle-wall portions on the body.

15. The display module as claimed in claim 1, wherein the baffle-wall portions are located on an upper-surface of the body.

* * * * *